(12) United States Patent
Ishitoya et al.

(10) Patent No.: US 8,550,105 B2
(45) Date of Patent: Oct. 8, 2013

(54) VALVE SYSTEM OF HIGH PRESSURE TANK FOR VEHICLE

(75) Inventors: Tsukuo Ishitoya, Toyota (JP); Eiji Okawachi, Toyota (JP); Kazushi Numazaki, Toyota (JP); Hisanori Kondo, Seto (JP); Koji Koide, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/125,683

(22) PCT Filed: Jun. 30, 2010

(86) PCT No.: PCT/IB2010/001586
§ 371 (c)(1),
(2), (4) Date: Apr. 22, 2011

(87) PCT Pub. No.: WO2011/001255
PCT Pub. Date: Jan. 6, 2011

(65) Prior Publication Data
US 2012/0132298 A1    May 31, 2012

(30) Foreign Application Priority Data

Jul. 3, 2009    (JP) .................................. 2009-158679

(51) Int. Cl.
F16K 17/38    (2006.01)
F17C 7/00    (2006.01)
F17C 13/04    (2006.01)
F17C 13/12    (2006.01)

(52) U.S. Cl.
USPC ................ 137/72; 137/80; 251/67; 220/89.1; 220/89.4

(58) Field of Classification Search
USPC .................... 137/67, 72, 74, 79, 80; 251/67; 220/89.1, 89.4
See application file for complete search history.

(56) References Cited

U.S. PATENT DOCUMENTS

| | | | | |
|---|---|---|---|---|
| 346,571 A | * | 8/1886 | Ashcraft | 137/72 |
| 395,856 A | * | 1/1889 | Stuckert | 137/72 |
| 1,744,977 A | * | 1/1930 | Lovekin | 137/72 |
| 1,891,183 A | * | 12/1932 | Rowley | 137/72 |
| 2,522,962 A | * | 9/1950 | Reger | 137/72 |
| 3,618,627 A | * | 11/1971 | Wagner | 137/72 |
| 3,776,313 A | * | 12/1973 | DePalma | 137/80 |
| 5,298,088 A | | 3/1994 | Gray, Jr. | |
| 2003/0102051 A1 | | 6/2003 | Hasaka et al. | |

FOREIGN PATENT DOCUMENTS

| | | |
|---|---|---|
| DE | 10 2009 019 833 A1 | 12/2009 |
| JP | 2005-282764 A | 10/2005 |
| JP | 2006-242225 A | 9/2006 |
| JP | 2008-121651 A | 5/2008 |
| JP | 2008-169929 A | 7/2008 |
| JP | 2008-232408 A | 10/2008 |

OTHER PUBLICATIONS

Office Action issued Jul. 27, 2012 in DE 11 2010 000 058.1 and English translation thereof.

* cited by examiner

*Primary Examiner* — John Rivell
(74) *Attorney, Agent, or Firm* — Kenyon & Kenyon LLP (57) ABSTRACT

A valve system includes a fusible plug valve that functions as a fusible plug valve and as a manual valve. When functioning as a fusible plug valve, the fusible plug valve opens at a high temperature to release gas from a high pressure tank to outside. When functioning as a manual valve, the fusible plug valve is opened manually to release the gas from the high pressure tank to the outside.

6 Claims, 10 Drawing Sheets

RELATED ART

VALVE SYSTEM OF HIGH PRESSURE TANK FOR VEHICLE

FIELD OF THE INVENTION

The present invention relates to a valve system structure of a high pressure tank for a vehicle.

BACKGROUND OF THE INVENTION

A known fuel cell vehicle runs on electric power that is generated in a fuel cell. The fuel cell is supplied with fuel, such as hydrogen gas, to generate the electric power. Such fuel cell vehicle normally has a high pressure tank that contains the fuel under high pressure to be used for the fuel cell. A valve system is mounted to a mouthpiece of the high pressure tank. The valve system has a gas flow passage and various valves that are located on the gas flow passage. The gas flow passage and the various valves are integrated together into the valve system.

Japanese Patent Application Publication No. 2006-242225 (JP-A-2006-242225) discloses a valve system for a gas container. The valve system has a first passage and a second passage that communicate the gas container with the outside. The first passage is designed to flow gas into the gas container. The second passage is designed to flow the gas out of the gas container. The valve system further has a communication passage and a shut-off valve. The communication passage connects the first passage to the second passage. The shut-off valve is located on the communication passage. The shut-off valve is normally closed. However, the shut-off valve is opened in an emergency where a valve on the second passage, which is located closer to the gas container than a connecting point of the second passage with the communication passage, is malfunctioned and cannot open. This allows gas in the gas container to flow through the first passage, the communication passage, and the second passage in order, thereby to depressurize the gas in the gas container.

The valve system that is disclosed in JP-A-2006-242225 also has a relief passage and a fusible plug valve. The relief passage is designed to relieve gas from the gas container to the outside. The fusible plug valve is located on the relief passage. According to this construction, when the fusible plug valve opens at a high temperature, the relief passage is communicated with the outside, thereby to depressurize the gas in the gas container.

Japanese Patent Application Publication No. 2008-232408 (JP-A-2008-232408) discloses a safety valve for a high pressure gas container. The safety valve has a function of discharging gas through the valve that is opened by moving a valve element when a fusible plug in the valve fuses at a high temperature. The safety valve also has a function of discharging gas through the valve that is opened by manually moving the valve element. The safety valve has a main body and a valve housing. The main body contains the valve element and the fusible plug. The valve housing contains the main body that is screw-joined to the valve housing. In the safety valve that has the aforementioned construction, the main body is rotated manually using a tool. This causes the main body together with the valve element and the fusible plug that are contained in the main body to all move toward the outside of the valve housing, so that the valve is opened to discharge gas.

As disclosed in JP-A-2006-242225, the valve system of a high pressure tank for a vehicle according to the related art has a fusible plug valve. The fusible plug valve is located on a release passage (the relief passage) that is designed to release gas from the high pressure tank to the outside. The fusible plug valve releases the gas in the high pressure tank to the outside at a high temperature. As disclosed in 2006-242225, the valve system of the high pressure tank for a vehicle further has a manual pressure reducing valve. The manual pressure reducing valve is located on the communication passage that communicates an inlet passage (the first passage) with an outlet passage (the second passage). The inlet passage flows gas into the high pressure tank. The outlet passage flows the gas out of the high pressure tank. When a valve that is located on the outlet passage, for example a main stop valve, is malfunctioned, the manual pressure reducing valve is opened manually to flow gas but of the high pressure tank in order to depressurize the gas in the high pressure tank. As described above, the valve system of the high pressure tank for a vehicle according to the related art is provided with two types of valves that operate in an emergency: the fusible plug valve and the manual pressure reducing valve. Moreover, this valve system has separate passages for these two types of valves to be placed. Therefore, a main body of the valve system tends to be larger in size. However, the vehicle has only a limited space for the high pressure tank installed on the vehicle, and thus should have only a tight space for the valve system to the high pressure tank.

JP-A-2008-232408 discloses the safety valve in which the fusible plug valve and the manual valve are combined together. It is conceivable that the safety valve that is disclosed in JP-A-2008-232408 is used in the valve system of the high pressure tank for a vehicle in order to reduce the size of the valve system. However, solely using this safety valve in the valve system produces the following problems. To be more specific, the safety valve that is disclosed in JP-A-2008-232408 is designed to exert gas pressure on the fusible plug through the valve element whenever the valve is closed. If the safety valve thus-designed is used in the valve system of the high pressure tank for a vehicle, the valve element, on which high gas pressure (for example 70 MPa) from the high pressure tank is exerted, causes the fusible plug to deform, so that valve is opened. This can cause the gas to be released from the high pressure tank to the outside even at a normal temperature.

SUMMARY OF THE INVENTION

An object of the present invention is to provide a valve system of a high pressure tank for a vehicle. The valve system has a simple structure to be suitable for reducing its size, while securing a function of a valve system according to the related art.

One aspect of the present invention is directed to a valve system of a high pressure tank for a vehicle. The valve system is mounted to the high pressure tank and includes: an inlet passage through which gas flows into the high pressure tank; an outlet passage through which gas flows out of the high pressure tank; a release passage through which gas is released from the high pressure tank to outside; and a fusible plug valve that is located along the release passage. The fusible plug valve includes: a fusible plug that melts above a prescribed temperature; a pin that is urged in an axial direction to press the fusible plug, wherein a side surface of the pin has a recessed portion that is recessed from a periphery of the pin; a valve element that is slidably fitted into the release passage to seal the release passage, wherein gas pressure from the high pressure tank urges the valve element into contact with the side surface of the pin; and a manual moving mechanism that allows a contact part between the valve element and the side surface of the pin to manually displace to the recessed portion. In a case that the fusible plug valve functions as a fusible plug valve, as the fusible plug melts, the pin moves to a space that is created by melting the fusible plug, while the valve element moves to a space that is created by moving the pin, so that the fusible plug valve is opened and the release passage is communicated with the outside. In a case that the fusible plug valve functions as a manual valve, as the contact part between the valve element and the side surface of the pin is displaced to the recessed portion by the manual moving mechanism, the valve element moves inward toward the recessed portion, so that fusible plug valve is opened and the release passage is communicated with the outside.

The recessed part may be tapered inward from the periphery of the pin. An amount of displacement of the contact part that is displaced by the manual moving mechanism may be adjusted, and therefore, an amount of movement of the valve element that moves inward toward the recessed portion may also be adjusted, thereby to adjust a valve opening.

The contact part may be displaced on the side surface of the pin along a circumferential direction. The manual moving mechanism may rotate the pin in the circumferential direction to displace the contact part toward the recessed portion, whereby the fusible plug valve functions as a manual valve.

The pin or the fusible plug may have an engaging part that engages with the manual moving mechanism. The manual moving mechanism may be engaged in the engaging part to rotate the pin in the circumferential direction.

The contact part may be provided on the side surface that moves along an axial direction of the pin. The manual moving mechanism may move the pin in the axial direction to displace the contact part to the recessed portion whereby the fusible plug valve functions as a manual valve.

The fusible plug valve may have a main body. The main body may comprise an engagement part that engages the manual moving mechanism, and may be moved by the manual moving mechanism in the axial direction of the pin. The pin and the fusible plug may be contained in the main body.

The fusible plug valve may have a housing and a main body that comprises the pin and the fusible plug, and that is screw-joined to the housing to be advanceable and retractable in the axial direction of the pin. The engaging part that engages with the manual moving mechanism may be formed in the main body. The manual moving mechanism may be engaged in the engaging part to rotate the main body relative to the housing, thereby to move the pin in the axial direction.

The valve system of a high pressure tank for a vehicle according to the present invention has the simple structure to be suitable for reducing its size, while securing the function of the valve system according to the related art.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

A valve system of a high pressure tank for a vehicle according to a first embodiment of the present invention will be described below with reference to the accompanying drawings. A fuel cell automobile is taken as an example. The fuel cell automobile runs on electric power that is generated in a fuel cell. The valve system of a high pressure tank to be mounted in such fuel cell automobile will be described below. It should be noted that the valve system according to the present invention is not only applied to the fuel cell automobile, but may also be applied to an internal combustion engine automobile that uses natural gas or other gaseous fuel as a fuel source.

Figure 1:
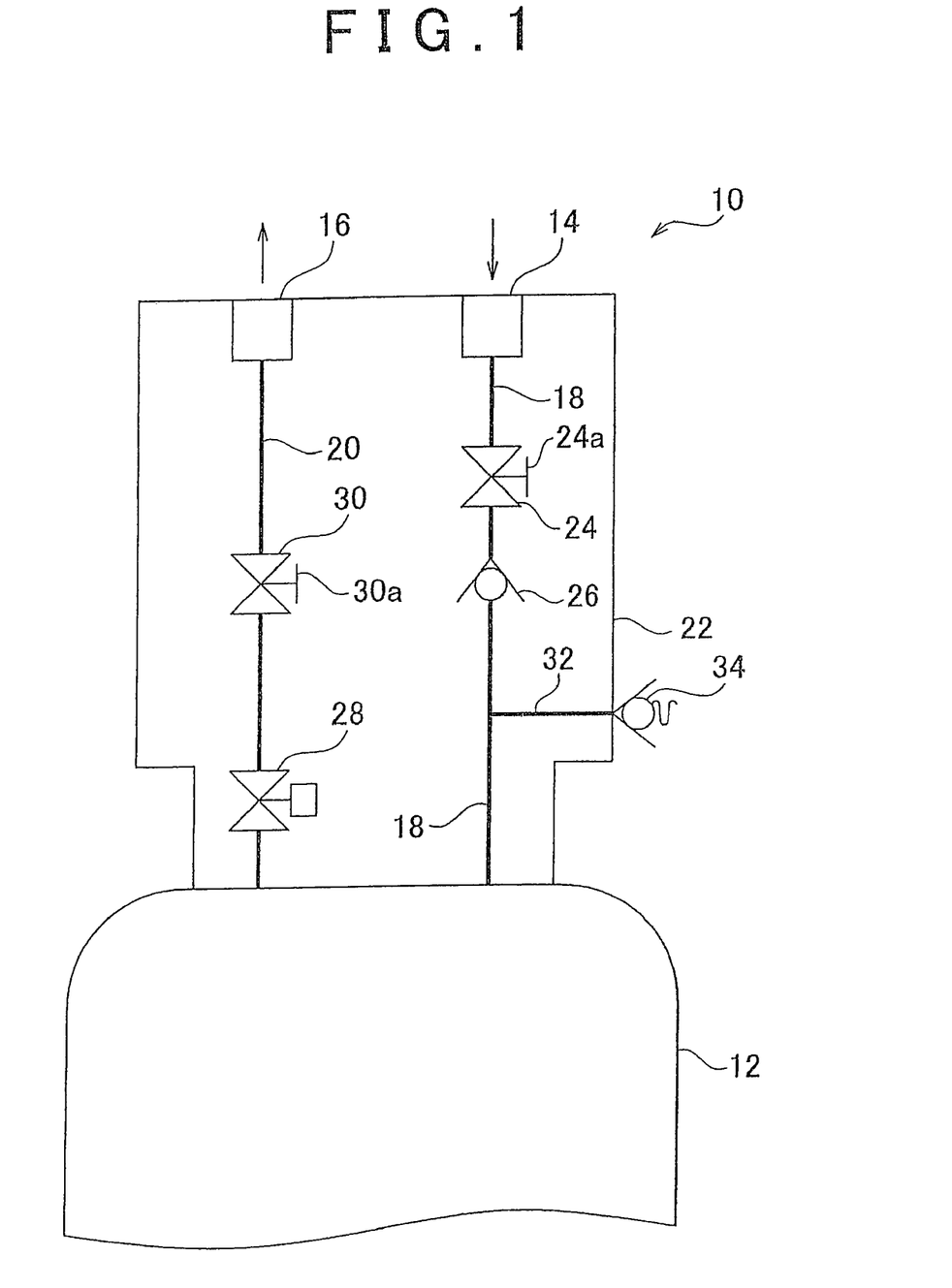
FIG. 1 illustrates a construction of a valve system of a high pressure tank for a vehicle according to a first embodiment of the present invention.

FIG. 1 illustrates a construction of the valve system of a high pressure tank for a vehicle according to the first embodiment of the present invention. A valve system 10 is mounted to a high pressure tank 12 at an axial end of the tank 12. The high pressure tank 12 is formed into a cylindrical shape to disperse pressure of gas that is contained in the high pressure tank 12. The pressure of the gas that is stored in the high pressure tank 12 is 70 MPa, for example. It should be noted that this numerical value is only one example of the pressure of the gas that is stored in the high pressure tank 12, and the present is not limited to this value.

The valve system 10 has a gas inlet 14, a gas outlet 16, a inlet passage 18, a outlet passage 20, and a system housing 22. The inlet passage 18 is designed to flow gas through the gas inlet 14 into the high pressure tank 12. The outlet passage 20 is designed to flow the gas out of the high pressure tank 12 through the gas outlet 16. The system housing 22 is designed to contain therein the gas inlet 14, the gas outlet 16, the inlet passage 18, and the outlet passage 20.

The gas inlet 14 is designed to fill the high pressure tank 12 with gas from an external gas source. The gas inlet 14 is provided in the system housing 22, while being exposed from a surface of the system housing 22. The gas inlet 14 is connected to an external gas connection port (not shown) to supply gas from the external gas source to the high pressure tank 12.

In contrast, the gas outlet 16 is designed to supply gas that is stored in the high pressure tank 12 to a fuel cell (not shown). The gas outlet 16 is provided in the system housing 22, while being exposed from the surface of the system housing 22. The gas outlet 16 is connected to a gas supply passage (not shown) that directs gas to the fuel cell to supply the gas from the high pressure tank 12 to the fuel cell.

On the inlet passage 18, an inlet manual valve 24 and a check valve 26 are located in order in a direction from the gas inlet 14 toward the high pressure tank 12. The inlet manual valve 24 and the check valve 26 are contained in the system housing 22.

The inlet manual valve 24 has a manipulation part 24a that is manually manipulatable. The manipulation part 24a is manipulated to open or close (turn-ON or turn-OFF) a valve element (not shown) of the inlet manual valve 24. Also, the manipulation part 24a is manipulated to adjust an opening of the valve element, so that the inlet manual valve 24 adjusts a gas flow rate. The inlet manual valve 24 is normally in an open state.

The check valve 26 allows gas to flow in one direction, but is designed to prevent the gas from flowing in the other direction. The check valve 26 according to the first embodiment of the present invention is designed to allow gas to flow from the gas inlet 14 to the high pressure tank 12, but to prevent the gas from flowing from the high pressure tank 12 to the gas inlet 14.

In contrast, on the outlet passage 20, a main stop valve 28 and an outlet manual valve 30 are located in order in a direction from the high pressure tank 12 toward the gas outlet 16. The main stop valve 28 and the outlet manual valve 30 are contained in the system housing 22.

The main stop valve 28 is an electromagnetic valve that drives an electromagnet in response to an electric signal to open or close the valve. The main stop valve 28 is controlled to a closed, state when the vehicle stops, more specifically, when an ignition switch is turned-OFF, and is also controlled to an open state when the vehicle runs, more specifically, when the ignition switch is turned-ON. A pressure sensor (not shown) is located on the gas supply passage that is connected to the gas outlet 16. When the pressure sensor detects a pressure equal to or above a predetermined value, the main stop valve 28 receives an electric signal from the pressure sensor and closes a valve element.

The outlet manual valve 30 has a manipulation part 30a that is manually manipulatable. The manipulation part 30a is manipulated to open or close (turn-ON or turn-OFF) a valve element (not shown) of the outlet manual valve 30. Also, the manipulation part 30a is manipulated to adjust an opening of the valve element, so that the outlet manual valve 30 adjusts a gas flow rate. The outlet manual valve 30 is normally in an open state.

A part of the inlet passage 18 is located between the check valve 26 and the high pressure tank 12. A release passage 32 is connected to this part of the inlet passage 18. The release passage 32 is designed to release gas from the high pressure tank 12 to the outside. A fusible plug valve 34 is located on the release passage 32. The fusible plug valve 34 is provided such that it partly protrudes from the surface of the system housing 22.

The fusible plug valve 34 according to the first embodiment of the present invention has a function of releasing gas from the high pressure tank through the valve that is opened when an ambient temperature exceeds a predetermined temperature. The fusible plug valve 34 also has a function of releasing gas from the high pressure tank through the valve that is opened manually. As described above, the fusible plug valve 34 not only has its original function, but also has the function as a manual pressure reducing valve. This avoids the need for providing two types of separate valves: a fusible plug valve and a manual pressure reducing valve in the valve system 10. Thus, the valve system 10 according to the first embodiment of the invention saves a space for one valve, compared to a valve system according to the related art. This results in a reduction in size of the valve system 10. In addition, the valve system according to the related art has separate passages that are formed for those two types of separate valves to be placed. In contrast, the fusible plug valve 34 that has the two functions as a fusible plug valve and as a manual pressure reducing valve is used in the first embodiment of the present invention. This avoids the need for a communication passage that communicates the inlet passage with the outlet passage and on which the manual pressure reducing valve according to the related art is placed. Consequently, the valve system 10 according to the first embodiment of the present invention can be smaller in size than the valve system according to the related art.

Figure 2:
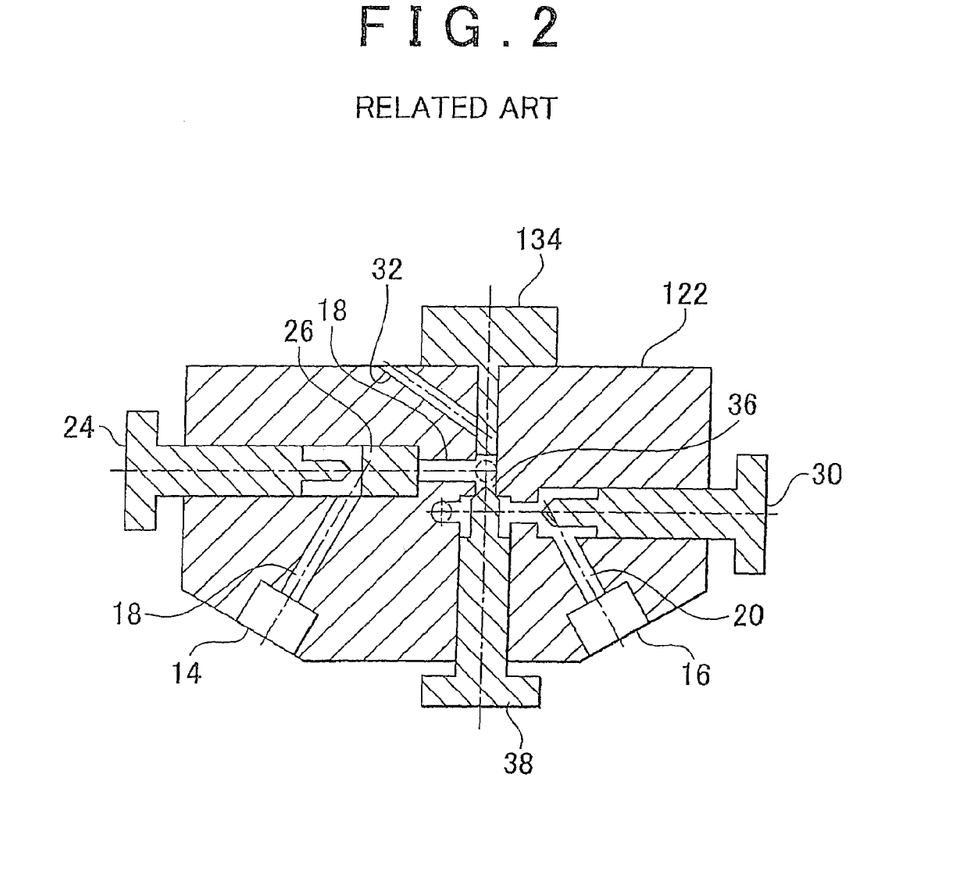
FIG. 2 illustrates a construction of a system housing of a valve system according to the related art.
Figure 3:
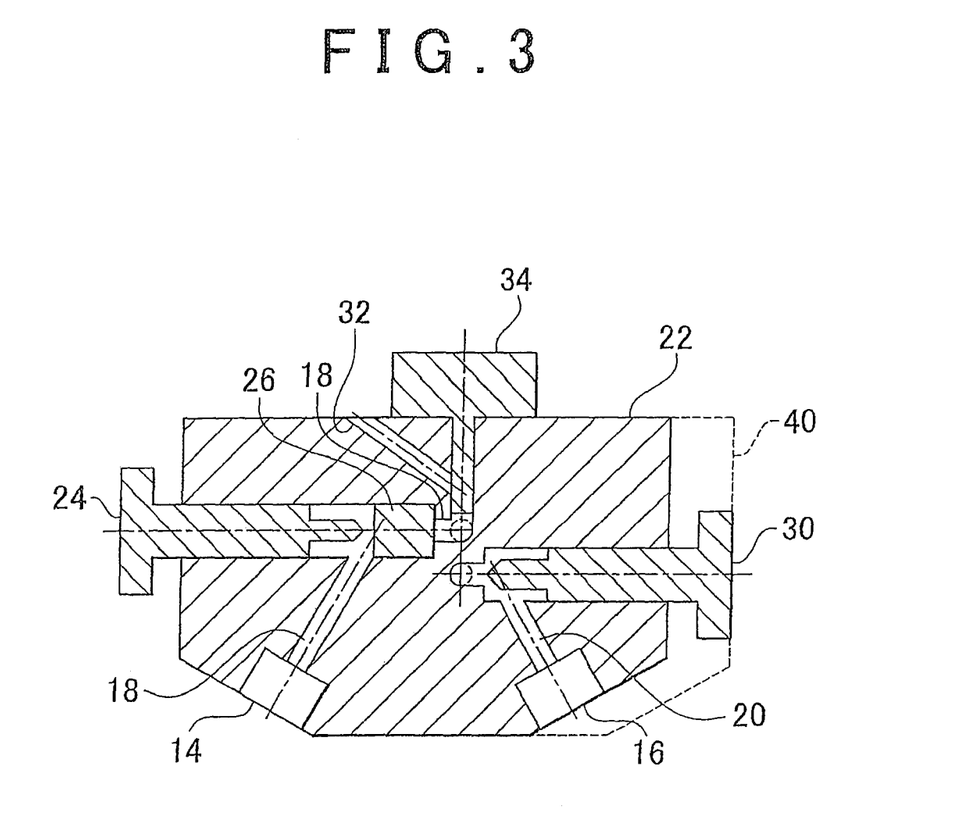
FIG. 3 illustrates a construction of a system housing of the valve system according to the first embodiment of the present invention.

With reference to FIG. 2 and FIG. 3, how the valve system 10 according to the first embodiment of the present invention is different in size from the valve system according to the related art will be described below. FIG. 2 illustrates a construction of a system housing of the valve system according to the related art. FIG. 3 illustrates a construction of the system housing 22 of the valve system 10 according to the first embodiment of the present invention. In FIG. 2, the same components as those in the first embodiment of the present invention are denoted by the same reference numerals for the sake of convenience, and description of the same components is not repeated. However, as described above, the system housing 22 according to the first embodiment of the present invention is smaller in size than the system housing according to the related art. Therefore, the system housing according to the related art is denoted by a reference numeral 122 to distinguish the system housing 122 from the system housing 22. In addition, the fusible plug valve 34 according to the first embodiment of the present invention has an additional function compared to a fusible plug valve according to the related art. Therefore, the fusible plug valve according to the related art is denoted by a reference numeral 134 to distinguish the fusible plug valve 134 from the fusible plug valve 34.

FIG. 2 is a plan view of the system housing 122 when viewed on a plane perpendicular to an axial direction of the high pressure tank 12. FIG. 3 is a plan view of the system housing 22 when viewed on a plane perpendicular to the axial direction of the high pressure tank 12. An axis of the high pressure tank 12 extends in a vertical direction with respect to the sheet plane, and the high pressure tank 12 is positioned on the back side of the sheet plane. The main stop valve 28 is located on the outlet passage 20 between the plane of FIG. 2 and FIG. 3 and the high pressure tank 12. The main stop valve 28 is therefore not shown in FIG. 2 and FIG. 3.

As shown in FIG. 2, a communication passage 36 and a manual pressure reducing valve 38 are provided in the system housing 122. The communication passage 36 is designed to communicate the inlet passage 18 with the outlet passage 20. The manual pressure reducing valve 38 is located on the communication passage 36. In contrast, as shown in FIG. 3, no such component as the communication passage 36 and the manual pressure reducing valve 38 are provided in the system housing 22. This allows the system housing 22 according to the first embodiment of the present invention to be formed smaller in size than the system housing 122 according to the related art. With reference to FIG. 3, an outline of the system housing 122 according to the related art is shown by a broken line 40, and an outline of the system housing 22 according to the first embodiment of the present invention is smaller than the outline of the system housing 122. As described above, the valve system 10 according to the first embodiment of the present invention is formed smaller in size than the valve system according to the related art by removing the communication passage 36 and the manual pressure reducing valve 38 from the valve system according to the related art.

Figure 4:
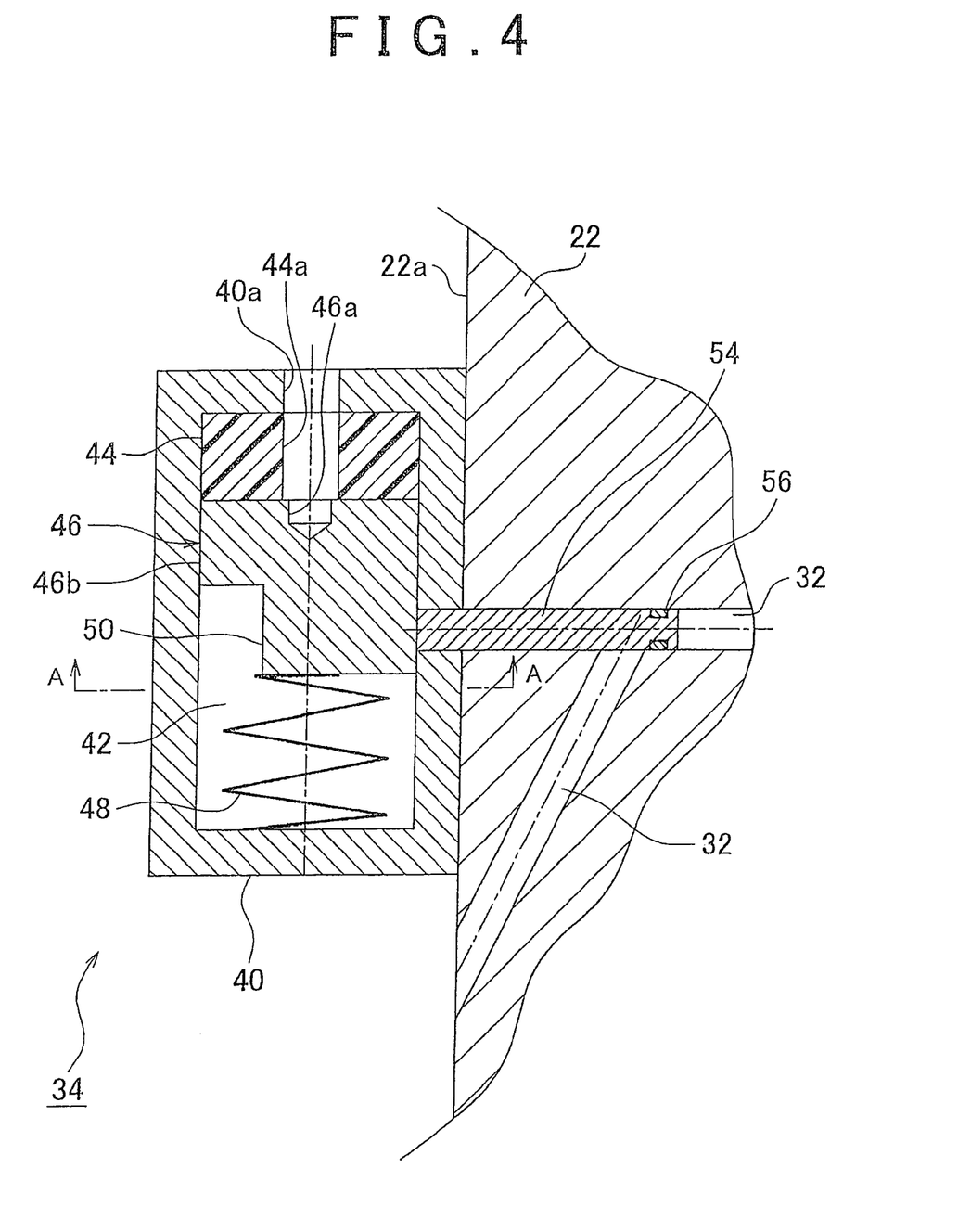
FIG. 4 illustrates a construction of a fusible plug valve according to the first embodiment of the present invention.

A specific construction of the fusible plug valve 34 according to the first embodiment of the present invention will be described below. FIG. 4 illustrates the construction of the fusible plug valve 34 according to the first embodiment of the present invention.

The fusible plug valve 34 has a valve housing 40 that is mounted on a surface 22a of the system housing 22. The valve housing 40 has an inner cylindrical container chamber 42. In the container chamber 42, a fusible plug 44, a pin 46, and a spring member 48 are contained and arranged in line. The valve housing 40 has a through hole 40a that is formed on an axis of the container chamber 42 (an axis extending in a top-bottom direction of the drawing sheet). The through hole 40 runs through from the container chamber 42 to the outside.

The through hole 40a of the valve housing 40 is formed on a first inner wall of the container chamber 42. The fusible plug 44 is located in contact with the first inner wall. The fusible plug 44 is made of a material that is fused when an ambient temperature exceeds a predetermined temperature (for example 110° C.). For example, the fusible plug 44 is made of metal, such as lead and tin. The fusible plug 44 has a through hole 44a that is formed on the axis of the container chamber 42 or concentrically with the through hole 40a. The through hole 44a runs through the fusible plug 44.

The pin 46 is located in contact with the fusible plug 44. The spring member 48 is located such that one end of the spring member 48 is brought into contact with a second inner wall of the container chamber 42, while the other end is brought into contact with the pin 46. The second inner wall of the container chamber 42 is opposed to the first inner wall on which the through hole 40a is formed. The spring member 48 allows the pin 46 to urge the fusible plug 44 toward the first inner wall of the container chamber 42. The pin 46 has an engaging hole 46a that is formed on the axis of the container chamber 42 or concentrically with the through holes 40a and 44a. A manual moving mechanism (not shown), for example a handle, is engaged in the engaging hole 46a. The manual moving mechanism according to the first embodiment of the present invention is a removable member that is removable from the fusible plug valve 34. However, the present invention is not limited to the removable member, and the manual moving mechanism may be a member that is always attached to the fusible plug member 34. The manual moving mechanism is engaged in the engaging hole 46a to manually rotate the pin 46 in a circumferential direction.

Figure 5:
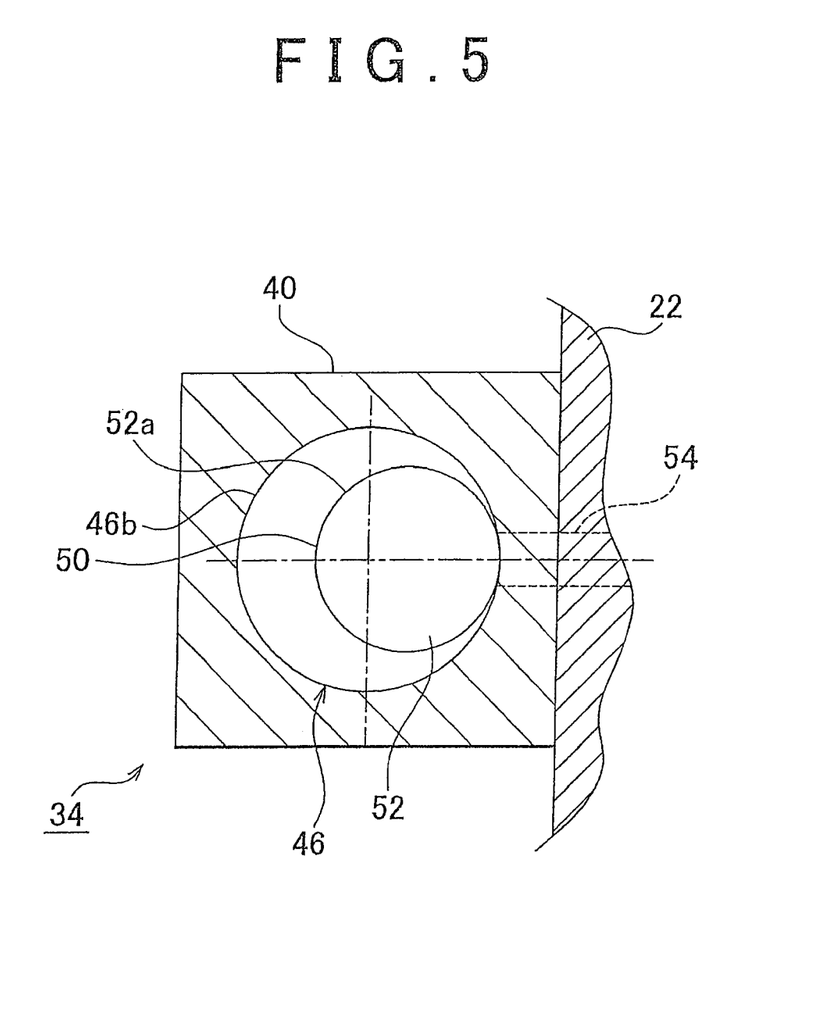
FIG. 5 is a sectional view of the fusible plug valve taken along the line A-A of FIG. 4.

The pin 46 has a periphery in contact with a third inner wall of the container chamber 42 or has a side surface 46b on a cylindrical part of the pin 46. The pin 46 also has a recessed part 50 that is recessed from the side surface 46b. With reference to FIG. 5, the recessed part 50 will be hereinafter described. FIG. 5 is a sectional view of the fusible plug valve 34 taken along the line A-A of FIG. 4. As shown in FIG. 5, the pin 46 has a smaller-diameter cylindrical part 52 that has a smaller diameter than a diameter of a main body of the pin 46. The smaller-diameter cylindrical part 52 is provided with its side surface 52a and the side surface 46b of the main body of the pin 46 aligned along the system housing 22 side, in other words, along a valve element 54 side. The valve element 54 will be described later. In short, an axis of the smaller-diameter cylindrical part 52 is eccentric with respect to an axis of the main body of the pin 46. A part of the side surface 52a of the smaller-diameter cylindrical part 52 is brought into contact with the valve element 54, while the opposite part of the side surface 52a relative to the contact part of the side surface 52a forms the recessed part 50 that is recessed from the side surface 46b of the main body of the pin 46.

Referring back to FIG. 4, the fusible plug valve 34 is slidably inserted into the release passage 32. The fusible plug valve 34 has the valve element 54 that opens or closes the release passage 32. The valve element 54 has a sealing member 56. The sealing member 56 is provided in an annular fashion on an outer circumferential surface of the valve element 54. The sealing member 56 is an O-ring, for example. When the valve element 54 is inserted into the release passage 32, the sealing member 56 is sealingly fitted onto an inner circumferential surface of the release passage 32 to seal a gap between the outer circumferential surface of the valve element 54 and the inner circumferential surface of the release passage 32.

The valve element 54 is provided with its axis (extending in a left-right direction of the drawing sheet) oriented perpendicular to the axis of the pin 46. The valve element 54 is urged by gas pressure within a part of the release passage 32 on the high pressure tank 12 side, and is brought into contact with the side surface of the pin 46 or with the side surface 52a of the smaller-diameter cylindrical part 52. According to this construction, the pin 46 prevents the fusible plug 44 from being urged directly by the valve element 54 on which high gas pressure (70 MPa) from the high pressure tank 12 is exerted. This ensures prevention of the fusible plug 44 from being deformed at a normal temperature, and thus prevention of gas that is contained in the high pressure tank from being released to the outside. It should be noted that although in the description of the first embodiment of the present invention, the valve element 54 is located with its axis (extending in the left-right direction of the drawing sheet) oriented perpendicular to the axis of the pin 46, the present invention is not limited to this construction. As long as the gas pressure from the high pressure tank is exerted on the valve element 54 and is exerted indirectly on the fusible plug 44 through the pin 46, the valve element 54 may be located with its axis intersecting the axis of the pin 46 at any angle.

Figure 6:
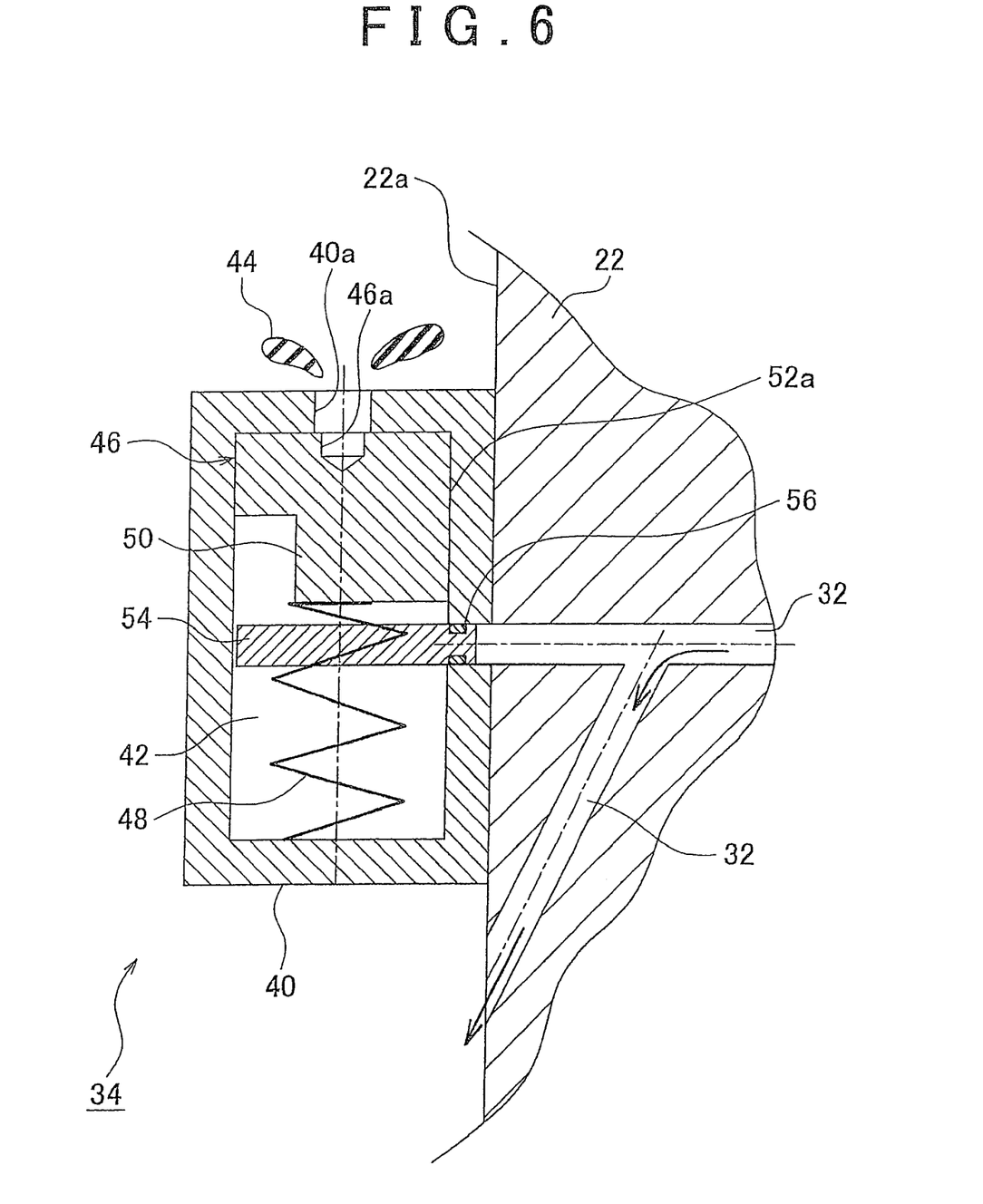
FIG. 6 illustrates an operation state of the fusible plug valve when the valve functions as a fusible plug valve.
Figure 7:
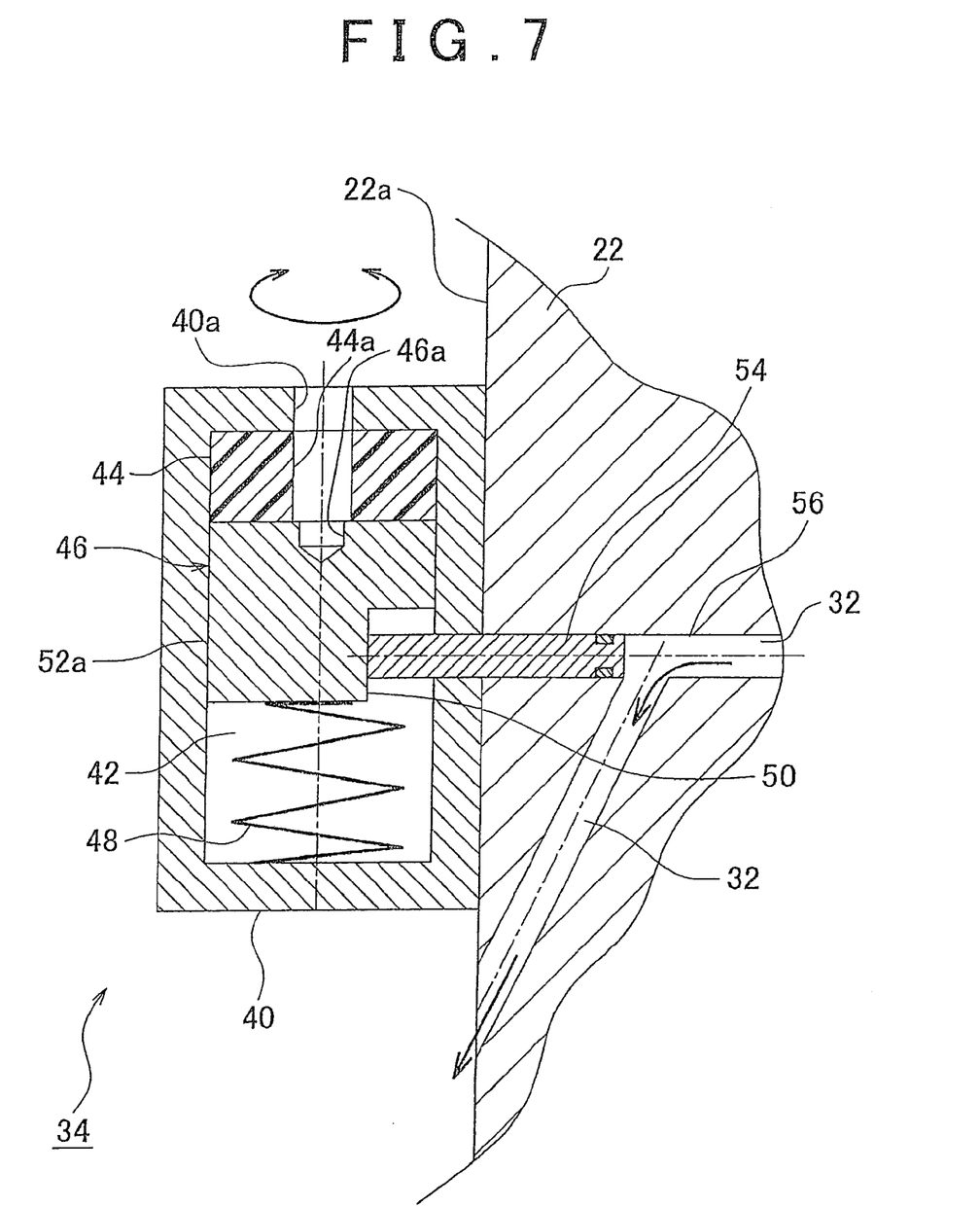
FIG. 7 illustrates an operation state of the fusible plug valve when the valve functions as a manual valve.

With reference to FIG. 6 and FIG. 7, operation of the fusible plug valve 34 that has the aforementioned construction will be described below. FIG. 6 illustrates an operation state of the fusible plug valve 34 when the valve 34 functions as a fusible plug valve. FIG. 7 illustrates an operation state of the fusible plug valve 34 when the valve 34 functions as a manual valve.

With reference to FIG. 6, the operation of the fusible plug valve 34 when the valve 34 functions as a general fusible plug valve will be first described below. The fusible plug 44 is fused when an ambient temperature exceeds a predetermined temperature of 110° C., for example. The fusible plug 44 thus-fused is released out of the valve housing 40 through the through hole 40a by the pin 46 to which an elastic force of the spring member 48 is applied. This causes the pin 46 to move to a space where the fusible plug 44 is originally located. In conjunction with the movement of the pin 46, the side surface 52a that is urged by the valve element 54 moves. Thus, the valve element 54, on which gas pressure is exerted, moves into a space where the pin 46 is originally located or into the container chamber 42. This allows the release passage 32 to be communicated with the outside, so that the gas is released from the high pressure tank 12 to the outside, as shown in FIG. 6.

In turn, with reference to FIG. 7, the operation of the fusible plug valve 34 when the valve 34 functions as a general manual valve will be described below. The manual moving mechanism is engaged in the engaging hole 46a and the pin 46 is manually rotated in the circumferential direction, so that a contact part between the valve element 54 and the side surface 52a of the pin 46 is displaced to the recessed part 50. The recessed part 50 is recessed from the side surface 46b of the main body of the pin 46. Therefore, the valve element 54 moves into the container chamber 42 because gas pressure is exerted on the valve element 54. This allows the release passage 32 to be communicated with the outside, so that the gas is released from the high pressure tank 12 to the outside, as shown in FIG. 7.

In the valve system 10 that has the fusible plug valve 34 described in the first embodiment, there is no need to provide two types of separate valves: a fusible plug valve and a manual pressure reducing valve. This further avoids the need for a communication passage that communicates the inlet passage 18 with the outlet passage 20. Consequently, the valve system 10 according to the first embodiment of the present invention can be smaller in size than the valve system according to the related art.

As shown in FIG. 5, in the fusible plug valve 34 according to the first embodiment of the present invention, the side surface 52a of the pin 46 is formed such that its contact part with the valve element 54 is gradually displaced inward from the main body of the pin 46 during a period for which the valve 34 is opened from the closed state when functioning as a manual valve. According to this construction, the manual moving mechanism is used to adjust an amount of rotation of the pin 46 in the circumferential direction or an amount of displacement of the contact part between the valve element 54 and the side surface 52a of the pin 46. Therefore, an amount of movement of the valve element 54 that moves inward from the main body of the pin 46 or that moves toward the recessed part 50 is adjusted, thereby to adjust a valve opening. Consequently, gas is depressurized in the high pressure tank 12 and is released to the outside. This achieves improvement in work safety.

Figure 8:
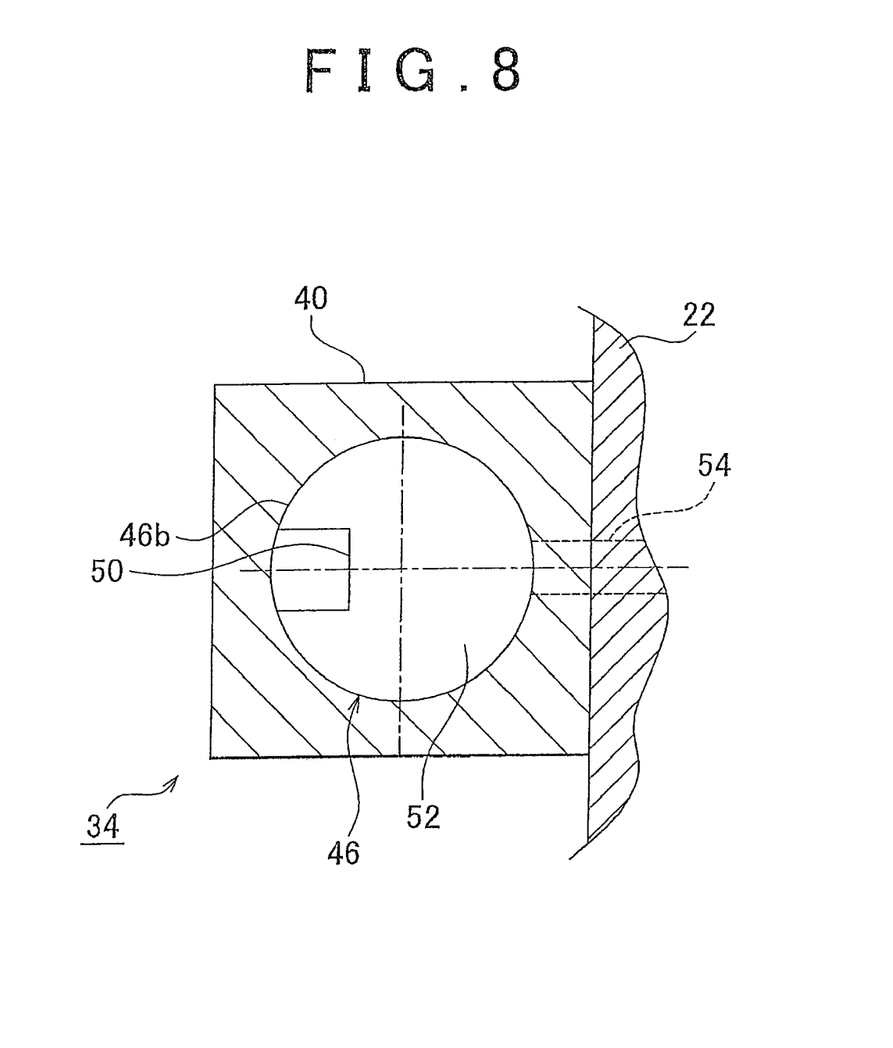
FIG. 8 is a sectional view of a fusible plug valve according to a second embodiment of the present invention, taken along the line A-A of FIG. 4.

In the description of the first embodiment of the present invention, the side surface 52a of the pin 46, which partly contacts with the valve element 54, is formed such that the side surface 52a is gradually recessed inward from the main body of the pin 46 from the position at which the fusible plug valve 34 is closed to the position at which the fusible plug valve 34 is opened when functioning as a manual valve. However, the present invention is not limited to this construction. As long as the valve is manually opened by rotating the pin 46 in the circumferential direction through the manual moving mechanism, the side surface 46b of the pin 46 may only be partly cut out to form the recessed part 50 that is recessed from the periphery of the pin 46, as shown in FIG. 8. However, according to this construction, the valve element 54 operates only at two positions: ON-position and OFF-position. This does not allow the valve element 54 to adjust the valve opening.

In the description of the first embodiment of the present invention, the pin 46 has the engaging hole 46a in which the manual moving mechanism is engaged. However, the present invention is not limited to this construction. As long as the manual moving mechanism allows the pin 46 to rotate in the circumferential direction, the fusible plug 44 may have an engaging hole in which the manual moving mechanism is engaged. In this case, the pin 46 and the fusible plug 44 may be joined together or their contact surfaces may be caught by each other. This allows the manual moving mechanism to rotate the pin 46 together, with the fusible plug 44 in the circumferential direction.

In the description of the first embodiment of the present invention, the release passage 32 is connected to the inlet passage 18 between the check valve 26 and the high pressure tank 12. However, the present invention is not limited to this construction. As long as gas is released from the high pressure tank 12 to the outside smoothly, the release passage 32 may be connected directly to the high pressure tank 12 or may be connected on the outlet passage 20 between the main stop valve 28 and the high pressure tank 12.

Figure 9:
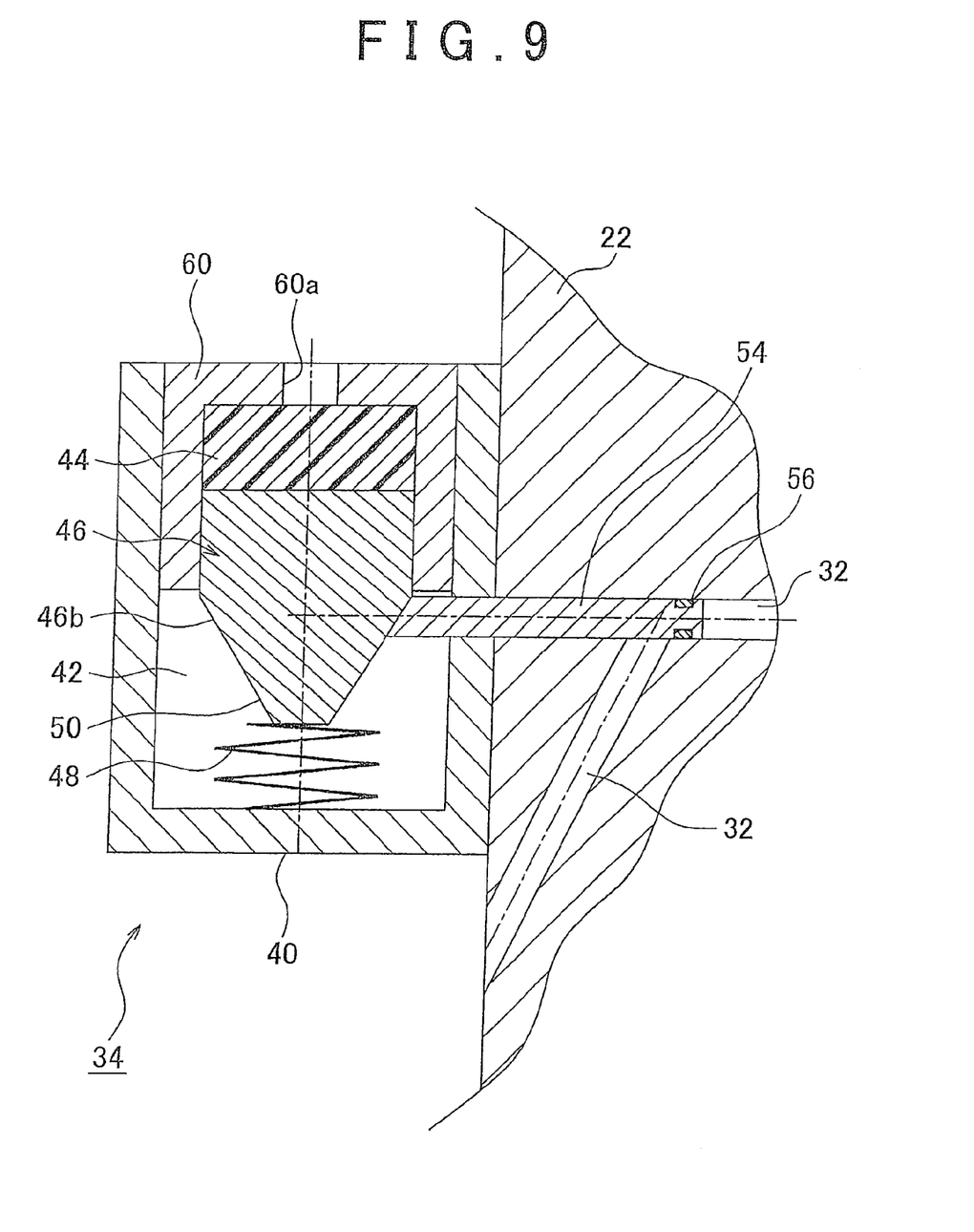
FIG. 9 illustrates a construction of the fusible plug valve according to the second embodiment of the present invention.
Figure 10:
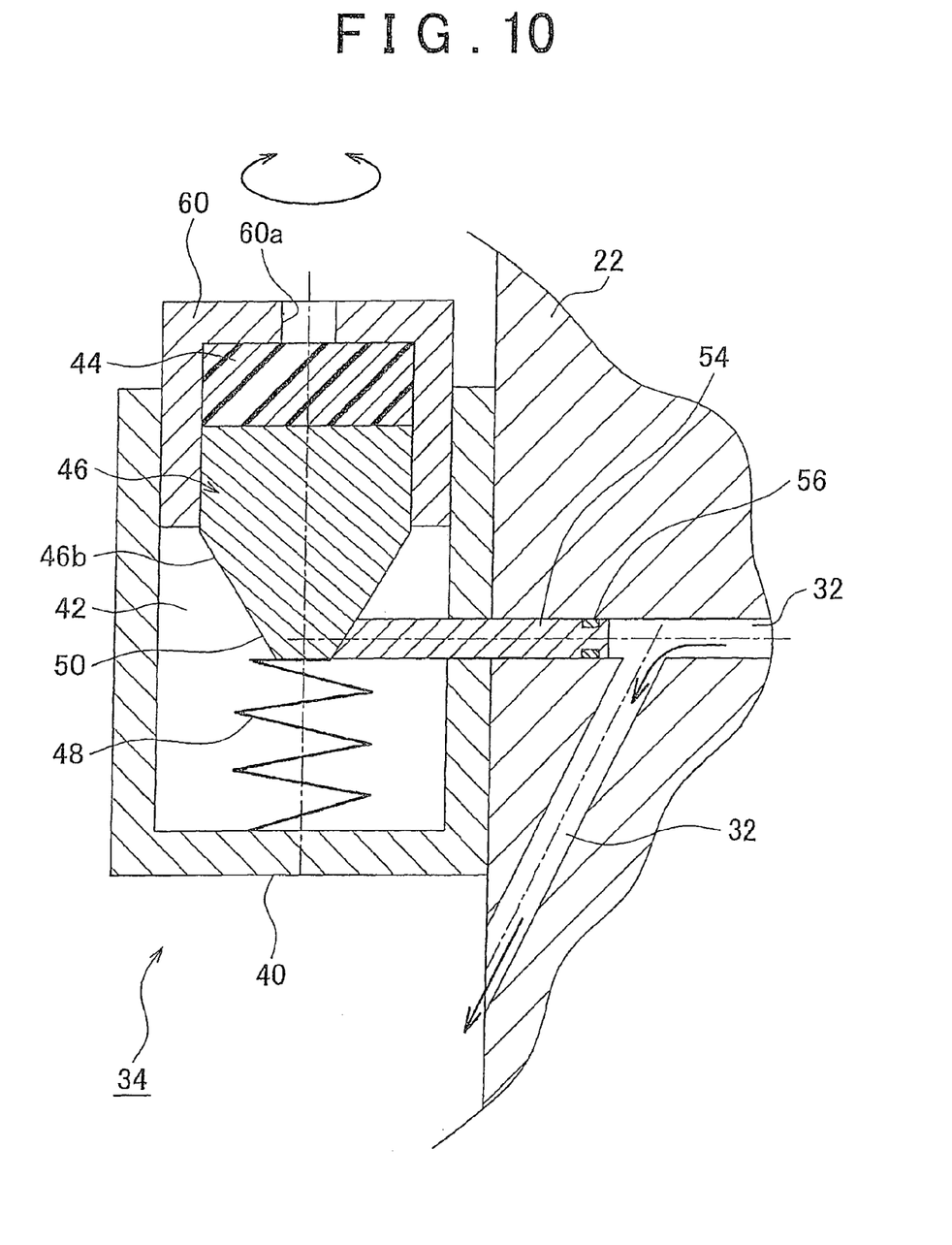
FIG. 10 illustrates an operation state of the fusible plug valve when the valve functions as a manual valve.

With reference to FIG. 9 and FIG. 10, a fusible plug valve 34 according to a second embodiment of the present invention will be described below. FIG. 9 illustrates a construction of the fusible plug valve 34 according to the second embodiment of the present invention. FIG. 10 illustrates an operation state of the fusible plug valve 34 when the valve 34 functions as a manual valve. In FIG. 9 and FIG. 10, the same components as those in the first embodiment of the present invention are denoted by the same reference numerals, and description of the same components is not repeated.

According to the second embodiment of the present invention, a container chamber 42 is opened to the outside at its axial one end. A main body 60 of the fusible plug valve 34 is contained in the container chamber 42, and is screw-joined to an inner wall of a cylindrical part of the container chamber 42. Thus, the main body 60 is rotated with respect to a housing 40, thereby to move the main body 60 advanceably and retractably in the axial direction of the container chamber 42. The main body 60 has an inner cylindrical space. In the inner cylindrical space, a fusible plug 44 and a pin 46 are contained. The main body 60 also has an engaging hole (not shown) in which the manual moving mechanism is engaged. The main body 60 further has a through hole 60a that runs through from the container chamber 42 to the outside on the axis of the container chamber 42. The through hole 60a is designed to discharge the fusible plug 44 that is fused at a high temperature to the outside.

According to the first embodiment of the present invention, the pin 46 is formed into a shape such that the side surface extends from its contact part with the valve element 54 in the closed state along the circumferential direction of the pin 46 to the recessed part 50. In contrast, according to the second embodiment of the present invention, the pin 46 is formed into a shape that extends along the axial direction of the pin 46. More specifically, the pin 46 is formed into a conical shape such that a cylindrical part of the pin 46 narrows gradually toward the spring member 48.

With reference to FIG. 9, operation of the fusible plug valve 34 according to the second embodiment of the present invention when the valve 34 functions as a manual valve will be described below. The manual moving mechanism is engaged in the engaging hole on the main body 60 to manually rotate the main body 60 in the circumferential direction in order to protrude the main body 60 from the open end of the container chamber 42. This allows the pin 46 to axially move together with the main body 60 to the open end of the container chamber 42, while rotating together with the main body 60. In conjunction with this movement, the contact part between the valve element 54 and the side surface 46b of the pin 46 causes the side surface 46b of the pin 46 to move in the axial direction. This allows the valve element 54 to contact with the side surface 46b of the pin 46 at the recessed part 50. The valve element 54 moves into the container chamber 42 because gas pressure is exerted on the valve element 54, so that the release passage 32 is communicated with the outside and gas is released from the high pressure tank 12 to the outside, as shown in FIG. 10.

In the valve system 10 that has the fusible plug valve 34 described in the second embodiment, there is no need to provide two types of separate valves: a fusible plug valve and a manual pressure reducing valve. This further avoids the need for a communication passage that communicates the inlet passage 18 with the outlet passage 20. Consequently, the valve system 10 according to the second embodiment of the present invention can be smaller in size than the valve system according to the related art.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A valve system of a high pressure tank for a vehicle, the valve system being mounted to the high pressure tank and comprising:
   an inlet passage through which gas flows into the high pressure tank;
   an outlet passage through which gas flows out of the high pressure tank;
   a release passage through which gas is released from the high pressure tank to outside;
   and a fusible plug valve that is located along the release passage, wherein
   the fusible plug valve includes:
      a fusible plug that melts above a prescribed temperature;
      a pin that is urged in an axial direction to press the fusible plug, wherein a side surface of the pin has a recessed portion that is recessed from a periphery of the pin;
      a valve element that is slidably fitted into the release passage to seal the release passage, wherein gas pressure from the high pressure tank urges the valve element into contact with the side surface of the pin; and
      a manual moving mechanism that allows a contact part between the valve element and the side surface of the pin to manually displace to the recessed portion,
   wherein the fusible plug valve functions as a fusible plug valve, as the fusible plug melts, the pin moves to a space that is created by melting the fusible plug, while the valve element moves to a space that is created by moving the pin, so that the fusible plug valve is opened and the release passage is communicated with the outside, and
   in a case that the fusible plug valve functions as a manual valve, as the contact part between the valve element and the side surface of the pin is displaced to the recessed portion by the manual moving mechanism, the valve element moves inward toward the recessed portion, so that fusible plug valve is opened and the release passage is communicated with the outside, and
   wherein the recessed portion is tapered inward from the periphery of the pin, and
   an amount of displacement of the contact part that is displaced by the manual moving mechanism is adjusted, and therefore, an amount of movement of the valve element that moves inward toward the recessed portion is also adjusted, thereby to adjust a valve opening.

2. The valve system according to claim 1, wherein
the contact part is displaced on the side surface of the pin along a circumferential direction, and
the manual moving mechanism rotates the pin in the circumferential direction to displace the contact part toward the recessed portion, whereby the fusible plug valve functions as a manual valve.

3. The valve system according to claim 1, wherein
the pin or the fusible plug has an engaging part that engages with the manual moving mechanism, and
the manual moving mechanism is engaged in the engaging part to rotate the pin in the circumferential direction.

4. The valve system according to claim 1, wherein
the contact part is provided on the side surface that moves along an axial direction of the pin, and
the manual moving mechanism moves the pin in the axial direction to displace the contact part to the recessed portion, whereby the fusible plug valve functions as a manual valve.

5. The valve system according to claim 4, wherein
the fusible plug valve includes a main body that comprises an engagement part that engages the manual moving mechanism, and is moved by the manual moving mechanism in the axial direction of the pin, and
the pin and the fusible plug are contained in the main body.

6. The valve system according to claim 4, wherein
the fusible plug valve includes a housing and a main body that comprises the pin and the fusible plug and that is screw-joined to the housing to advance and retract in the axial direction of the pin,
an engaging part that engages with the manual moving mechanism is formed in the main body, and
the manual moving mechanism is engaged in the engaging part to rotate the main body relative to the housing, thereby to move the pin in the axial direction.

* * * * *

UNITED STATES PATENT AND TRADEMARK OFFICE
CERTIFICATE OF CORRECTION

PATENT NO. : 8,550,105 B2  
APPLICATION NO. : 13/125683  
DATED : October 8, 2013  
INVENTOR(S) : T. Ishitoya et al.

It is certified that error appears in the above-identified patent and that said Letters Patent is hereby corrected as shown below:

In the Specification

Column 1, line 4, add the following paragraph:

-- This is a 371 national phase application of PCT/IB2010/001586 filed 30 June 2010, claiming priority to Japanese Patent Application No. 2009-158769 filed 03 July 2009, the contents of which are incorporated herein by reference. --.

Column 5, line 27, change "a closed, state" to read -- a closed state --.

Signed and Sealed this  
Fourth Day of February, 2014

Michelle K. Lee  
*Deputy Director of the United States Patent and Trademark Office*